United States Patent [19]

Scheckel

[11] Patent Number: 4,531,482
[45] Date of Patent: Jul. 30, 1985

[54] STARTING DEVICE FOR GASOLINE ENGINES

[76] Inventor: William D. Scheckel, 19716 Millhaven St., Independence, Mo. 64056

[21] Appl. No.: 475,307

[22] Filed: Mar. 14, 1983

[51] Int. Cl.³ .............................................. F02N 11/12
[52] U.S. Cl. .................... 123/179 SE; 74/6; 192/70.15; 192/70.17; 192/107 R
[58] Field of Search ............... 123/179 SE, 185 F; 74/6, 550; 192/107 R, 70.15, 70.17

[56] References Cited

U.S. PATENT DOCUMENTS

| | | | |
|---|---|---|---|
| 2,451,621 | 10/1948 | Houston | 192/107 R |
| 2,804,957 | 9/1957 | Pechin, Jr. | 123/179 SE |
| 3,190,276 | 6/1965 | Diggs | 123/179 SE |
| 4,399,782 | 8/1983 | Shelley | 123/179 SE |

Primary Examiner—Andrew M. Dolinar

[57] ABSTRACT

A starting device for gasoline engines which may be started by spinning the crankshafts thereof, and comprising a torque transmission device consisting of a male friction cone adapted to be fixed in and turned axially by an ordinary electric drill device, and a matching conical female cup adapted to be affixed concentrically to an engine crankshaft and to receive the male cone therein so that rotation of the latter rotates the former to start the engine. A novel connection of the cone to the electric drill permits misalignment of the drill axis with the crankshaft, and damps the application of rotary force to the cup to avoid shocks to the system.

2 Claims, 6 Drawing Figures

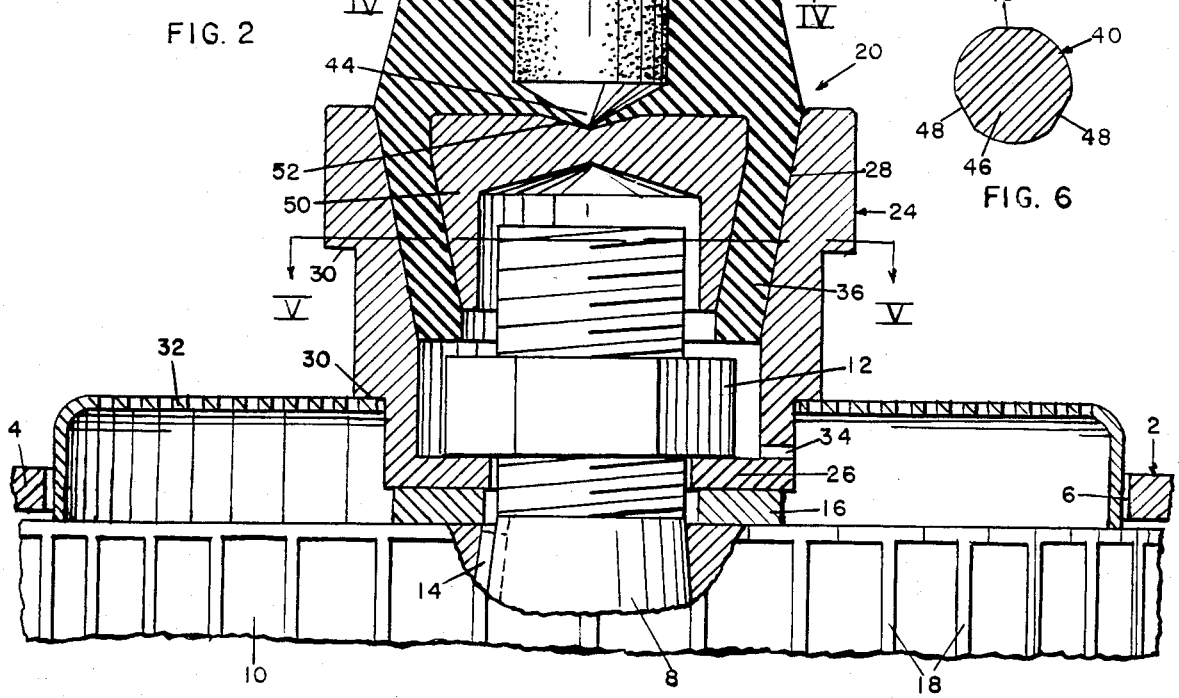

STARTING DEVICE FOR GASOLINE ENGINES

This invention relates to new and useful improvements in devices for assisting in the starting of gasoline engines of types which may be started by spinning the crankshafts thereof. It has been designed to assist in the starting of lawnmower engines, although it will be readily apparent that use of the device is not limited to this purpose.

One object of the present invention is the provision of a device the use of which permits the starting of a lawnmower engine by power supplied by an ordinary handheld electric drill. Some mowers are of course equipped with built-in electric starters, but such starters are quite expensive, are commonly utilized only on more elaborate mowers, and are not available to users not owning or having need for such elaborate mowers. Hand-held electric drills, on the other hand, are much less expensive, and are widely available to most persons. Many mowers are also supplied with pull-cord starters, in which a cord or rope is wound on a drum affixed concentrically to the engine crankshaft, so that pulling the free end of the cord turns the drum to spin the crankshaft. However, pull-cord starters are often unsatisfactory, for several reasons. Some engines may be characteristically "balky" or hard to start, or they may become flooded, so that the cord must be pulled with a very strong force, or pulled many times at high speed, which may be difficult or impossible for some women or other persons. Such starters may in fact be dangerous for persons having heart disease, back problems or other ailments. More specifically, since I of course have not invented the electric drill, my invention consists of a novel connector, or "torque transmitter" for connecting the electric drill to the engine crankshaft.

Another object is the provision of a torque transmitter of the character described consisting of a hollow female conical cup adapted to be rigidly affixed to an engine crankshaft, concentrically therewith and opening outwardly thereof, and a matching male cone adapted to be pressed into the cup to turn the cup by frictional engagement therewith, and having a stem projecting therefrom generally coaxially with the cone and adapted to be clutched in an ordinary electric drill.

A further object is the provision of a torque transmitter of the character described in which the body portion thereof is formed of a semi-rigid rubber or the like, the portion thereof to engage in said cup being provided with a rigid liner insert insuring a wide area of uniform pressure contact between the exterior of the body and the cup, with the stem projecting generally axially from the insert, but being movable both pivotally and rotatably relative to the insert, and the rubber body molded securely about both the insert and a portion of the stem. The yieldability of the rubber permits axial misalignment of the stem with the cup axis, whereby to accomodate for the virtual impossibility that a user could position and maintain the hand-held electric drill with the drill axis in precise coaxiality with the cup. The rotatability of the stem relative to the insert provides that torque can be transmitted from the stem to the cup only through the rubber of the body itself. By torsional yielding, the rubber cushions and dampens the applicaton of initial torque to the cup, so as to avoid pounding or "hammer blow" action and thereby prevent damaging shocks to the system.

Other objects are simplicity and economy of construction, efficiency and dependability of operation, and ease and convenience of installation and use.

With these objects in view, as well as other objects which will appear in the course of the specification, reference will be had to the accompanying drawing, wherein:

FIG. 1 is a side elevational view of the male cone element of the torque transmitting device of the present invention, FIG. 2 is a side elevational view of the female cup element of the device, FIG. 3 is an enlarged axial sectional view of the elements of the transmitter in operational engagement with each other, and related elements of a lawnmower, shown fragmentarily, with parts left in elevation and partially broken away, FIG. 4 is a reduced sectional view taken on line VI—VI of FIG. 3, FIG. 5 is a reduced sectional view taken on line V—V of FIG. 3, and FIG. 6 is a sectional view taken on line VI—VI of FIG. 3.

Like reference numerals apply to similar parts throughout the several views, and the numeral 2 applies generally to a lawnmower, shown fragmentarily and by way of example only, the top wall 4 of the housing or cowling of which is provided with a circular hole 6 through which the crankshaft 8 of the gasoline engine of the mower projects upwardly and concentrically. Just below top wall 4, the flywheel 10 of the engine is affixed on a tapered portion of the crankshaft by a nut 12 threaded on the crankshaft thereabove, and a lock washer 16 interposed therebetween, and prevented from rotating relative to the crankshaft by a key 14. The flywheel is also usually provided with blower vanes 18, for drawing air downwardly through hole 6 and blowing it downwardly over the engine for cooling purposes. The structure thus far described is of course well known, and common to many commercially available lawnmowers. The device constituting the subject matter of the present invention is designated generally by the numeral 20, and is a connector adapted to transmit the torque of an ordinary hand-held electric drill, not shown, to crankshaft 8, whereby to start the engine by spinning said crankshaft. Said connector consists basically of a male conical driven cone 22, shown separately in FIG. 1, and a female driven cup 24, shown separately in FIG. 2.

Cup 24 is internally hollow and has a planar floor 26, the floor being centrally apertured to receive crankshaft 8 therethrough, and being interposed between nut 12 and lock washer 16 to mount the cup in fixed relation to the crankshaft. Internally, the lower portion of the cup is cylindrical to accomodate nut 12, and the upper portion of the internal cavity is of upwardly enlarging conical form, as indicated at 28. Externally, cup 24 is provided with a plurality of vertically spaced apart, downwardly facing peripheral shoulders 30. Any one of said shoulders may be utilized to position and secure in place a perforated and skirted disc 32 which covers air hole 6 of the mower cowling and seats against said flywheel adjacent the periphery of said hole. Said disc permits free flow of engine cooling air therethrough, while preventing the entry of foreign matter into the engine compartment, or the accidental insertion of the user's fingers into the zone of the flywheel or its vanes. The elevation of the shoulders 30 may be properly selected to accomodate the cup to many mowers in common use. Once installed as described, the cup will ordinarily be left permanently in assembly with the mower. At the bottom of its internal cavity, it may be provided with a drain hole 34 for the purpose of preventing the collection of rainwater or the like therein.

Male driver cone 22 has a body portion consisting of an integral, one-piece mass of semi-rigid, but still resiliently flexible rubber, either natural or synthetic, the lower portion 36 of which is externally conical, and of a size and configuration to engage snugly in the conical interior of cup 24, tapering downwardly, and the upper portion 38 of which, as shown, is of reverse conical form, tapering upwardly, although this latter conical form is optional. A core of rigid material such as metal extends axially through substantially the entire length of the double cone. Said core includes a generally cylindrical stem 40 having an enlarged cylindrical portion 42 disposed axially in upper cone portion 38, and being tapered to a conical point 44 at its lower end, and an upwardly extending reduced portion 46 which projects exteriorly of the cone body and has flats 48 formed thereon to facilitate gripping thereof by the chuck jaws of an ordinary hand-held electric drill, not shown. The core also includes a metallic insert 50 of inverted cup shape molded in the lower portion 36 of cone 22, concentrically therewith. Externally, said insert is of conical form having an included angle equal to that of the internal conical surface 28 of cup 24, so as to provide a uniform thickness of the rubber cone body between the insert and the cup. The hollow interior of the insert opens downwardly through the bottom of the driver cone, so that it may receive the upper end of crankshaft 8 therein, as shown, whenever this may be necessary. The top wall of the insert may have a shallow conical recess 52 formed centrally in the top surface thereof, and the conical lower point 44 of stem 40 is engaged in said recess. Recess 52 has a larger included angle than point 44, so that stem 40 may be tilted universally out of coaxial relationship with the insert, as permitted by the yieldability of the rubber cone body, as well as being axially rotatable relative to said cone. The rubber body of the driver cone is molded snugly about both the insert and the enlarged lower portion 42 of the stem, whereby to serve as a case and assembly means for the rotary and universally pivotable connection between the stem and the insert.

In operation, cup 24 is affixted to engine crankshaft 8 by nut 12, as previously described, and the reduced extending portion 46 of stem 40 of driver cone 22 is affixed in the chuck of an ordinary hand-held electric drill, not shown, in the same manner that a drill bit is mounted in said chuck. The lower portion 36 of the driver cone is then inserted into the conical interior 28 of cup 24, and pressed firmly downwardly therein by the operator, who is of course holding the electric drill. The drill is then energized, usually by means of a trigger switch on the hand grip of the electric drill, to turn the stem 40 of the present device, which then transmits the torque exerted by the electric drill to cup 24, and thence to crankshaft 8, whereby to spin said crankshaft to start the lawnmower engine.

It will be readily apparent that the present torque transmitting device has several advantages. Firstly, it will be appreciated that the conical form of the mating portions of driver cone 22 and cup 24 creates a wedging action of the cone in the cup, whereby the downward force applied to the cone by the operator will be multiplied for application to the cup, whereby to supply greater torque force to the cup. The force multiplication thus generated depends on the generating angle of the conical shape, lesser generating angles providing greater force multiplication, so an angle may be selected which supplies the greatest force multiplication consistent with easy separation of the cone from the cup after the engine has started. The exterior surface of the effective portion 36 of the cone may be roughened, as indicated by the stippling in FIG. 1, and the interior conical surface 28 of the cup may be similarly roughened, in order to provide still more efficient transfer of torque to the cup.

The efficiency of torque transmission is further improved by the externally conical form of insert 50. It provides that downward force applied thereto by stem 40 will be directly converted to outward pressure on the layer of rubber between it and cup surface 28. Hence the rubber layer is loaded to a greater extent in direct compression, in which it has a relatively greater strength, rather than in shearing stress, in which it is relatively weak. Moreover, the generating angles of the insert, cone portion 36 and cup cone 28 are all equal. This provides that the layer of rubber pressed into the cup will have a uniform thickness over a substantial area. This provides a broad area in which the pressure of the rubber contact with the cup is generally uniform, and this broad contact of uniform pressure permits the transmission of relatively high torque, but by means of relatively low contact pressure per unit of area, which reduces wear on the driver cone over extended periods of use.

Downward force on insert 50 is of course exerted by the operator himself, through stem 40, by reason of the engagement of lower stem point 44 in recess socket 52 in the top of the insert. This engagement is pivotal, since the angle of the recess is greater than that of the point, the pivotal action being permitted by the yieldability of the rubber cone body surrounding the stem. Some pivoting at this point is almost inevitable, due to the virtual impossibility that the operator could hold and maintain the drill axis in precise coaxiality with cup 24 and crankshaft 8. However, despite any pivoting at this point, within reasonable limits, insert 50 and cone section 36 may remain in coaxial relation to the cup, which is important to efficient torque transmission. The use of recess 52 in the top of the insert may in most cases be dispensed with, and the rubber cone body relied on to maintain cone point 44 centered relative to the insert. However, use of the recess is preferred in order to provide a more positive centering action, and to prevent the possibly severe gyration which might otherwise occur if the stem point moved off-center due to permanent yielding or deformation of the rubber body.

In addition to the described pivotability, the engagement of point 44 in socket 52 is also rotatable, being resisted only by the yieldable strength of the surrounding rubber. Hence, torque applied to stem 40 by the electric drill does not cause it to transfer torque to the insert, but only to deform the rubber cone body in torsion, and the torque of the rubber surrounding the stem is then transmitted, through the rubber itself, to the portion 36 of the cone engaged in cup 24. As indicated in FIG. 3, the external surface of the enlarged portion 42 of the stem engaged in the rubber may be roughened in any suitable manner to provide efficient bonding with the rubber. Depending on the hardness and yieldability of the rubber used, stem 40 may turn as much as a quarter-turn, or even more, before cup 24 starts to turn, although the rubber will start to recover as soon as the cup starts to turn, and the load thereon therefore decreases. This torsional yieldability of the rubber body provides a dampening or cushioning effect, so that rotation of the cup, and hence of the crankshaft 8, starts more gradually and with less shock or hammer blow action. Such shock could render it very difficult for the operator to hold the electric drill, and result in possible injury, or could cause damage to the engine itself. Mechanical couplings could be used which provide both the described pivotal action and also the rotatability of the stem relative to insert 50, but these couplings would be relatively complicated and expensive. The use of the point-and-socket connection shown, and the extension of the rubber body to encase it and thus provide the housing and assembly means therefor, provides an extremely simple and economical means, which is completely effective, for providing both of the desired types of relative movement.

While I have shown and described a specific embodiment of my invention, it will be readily apparent that many minor changes of structure and operation could be made without departing from the spirit of the invention.

What I claim as new and desire to protect by Letters Patent is:

1. A starting device for a gasoline engine which may be started by spinning the crankshaft thereof, said device consisting of a torque transmission device operable to interconnect an ordinary hand-held electric drill with said crankshaft, and comprising:
    a. an internally conical cup,
    b. means operable to affix said cup to said crankshaft in coaxial and outwardly opening relation thereto,
    c. an externally conical driver cone configured to be inserted coaxially into said cup in mating engagement therewith, and to be pressed firmly thereinto, the external portion of said cone being formed of a body of resiliently yieldable material whereby to provide better traction against the interior surface of said cup, said cone also including a rigid insert encased within said resilient body, said insert being externally conical and having the same conical generating angle as the exterior surface of said body, concentrically therewith, whereby to provide a layer of said resilient body material having a uniform thickness over a wide area between said insert and said cup, and
    d. a stem carried generally coaxially by said cone and projecting therefrom for fixable engagement in the chuck of said electric drill, one end of said stem engaging said insert and being tapered to a point concentric to both the stem and the insert, whereby said stem may be universally pivoted and axially rotated relative to said insert, the resilient body of said cone being extended to encase a portion of said stem adjacent said cone, and being firmly bonded thereto, whereby to maintain said stem in engagement with said insert, and to resist yieldably both the pivotal and also the rotational movement of said stem relative to said insert.

2. A torque transmission device as recited in claim 1 wherein said insert is provided with a concentric recess in which the adjacent point of said stem is engaged for both pivotal and rotational movement, the recess insuring concentrically of the stem point relative to the insert.

* * * * *